US012773835B2

(12) United States Patent
Kunimoto

(10) Patent No.: US 12,773,835 B2
(45) Date of Patent: Oct. 27, 2026

(54) SEAT COVERING MATERIAL AND SEAT

(71) Applicant: Archem Inc., Tokyo (JP)

(72) Inventor: Kentaro Kunimoto, Yokohama (JP)

(73) Assignee: Archem Inc., Tokyo (JP)

(*) Notice: Subject to any disclaimer, the term of this patent is extended or adjusted under 35 U.S.C. 154(b) by 134 days.

(21) Appl. No.: 18/443,299

(22) Filed: Feb. 16, 2024

(65) Prior Publication Data

US 2024/0308178 A1 Sep. 19, 2024

(30) Foreign Application Priority Data

Mar. 14, 2023 (JP) ................................ 2023-040107

(51) Int. Cl.

| | |
|---|---|
| ***B32B 3/26*** | (2006.01) |
| ***B32B 5/02*** | (2006.01) |
| ***B32B 5/18*** | (2006.01) |
| ***B32B 5/24*** | (2006.01) |
| ***B32B 9/02*** | (2006.01) |
| ***B32B 9/04*** | (2006.01) |
| ***B60N 2/58*** | (2006.01) |

(52) U.S. Cl.

CPC .............. *B32B 5/245* (2013.01); *B32B 3/266* (2013.01); *B32B 5/022* (2013.01); *B32B 5/18* (2013.01); *B32B 9/025* (2013.01); *B32B 9/046* (2013.01); *B32B 2262/0261* (2013.01); *B32B 2266/0278* (2013.01); *B32B 2605/003* (2013.01); *B60N 2/58* (2013.01); *Y10T 428/24331* (2015.01)

(58) Field of Classification Search

CPC ........... B32B 5/245; B32B 3/266; B32B 5/18; B32B 9/025; B32B 9/046; B32B 2605/003; B60N 2/58; Y10T 428/24331

See application file for complete search history.

(56) References Cited

U.S. PATENT DOCUMENTS

| | | | | |
|---|---|---|---|---|
| 3,512,190 A * | 5/1970 | Fred | ..................... | A47C 27/146 5/730 |
| 4,110,881 A * | 9/1978 | Thompson | ........... | A47C 27/146 5/730 |

(Continued)

FOREIGN PATENT DOCUMENTS

| | | |
|---|---|---|
| JP | S63296932 A | 12/1988 |
| JP | H09173674 A | 7/1997 |

(Continued)

OTHER PUBLICATIONS

Jun. 28, 2024, search result of the Extended European Search Report issued by the European Patent Office in the corresponding European Patent Application No. 24156182.8.

(Continued)

*Primary Examiner* — Donald M Flores, Jr.

(74) *Attorney, Agent, or Firm* — KENJA IP LAW PC

(57) ABSTRACT

It would be helpful to provide a seat covering material that prevents the occurrence of wrinkles and has excellent design properties, and to provide, with the use of such a seat covering material, a seat that prevents the occurrence of wrinkles and has excellent design properties. A seat covering material 1 and a seat using such a seat covering material 1 include at least an outer layer 2, a resin foam layer 3, and a lining layer 4. At least one of the lining layer 4 or the resin foam layer 3 has cuts 5.

11 Claims, 6 Drawing Sheets

(56) References Cited

U.S. PATENT DOCUMENTS

| | | | | |
|---|---|---|---|---|
| 6,254,122 | B1 * | 7/2001 | Wu | B60R 21/207 280/730.2 |
| 2004/0194215 | A1 * | 10/2004 | Kuhn | A47C 27/146 5/653 |
| 2007/0018435 | A1 * | 1/2007 | Muller | B60R 21/2165 280/732 |
| 2016/0107551 | A1 * | 4/2016 | Nii | B60N 2/5678 297/452.47 |
| 2022/0001779 | A1 | 1/2022 | Yamaguchi et al. | |
| 2023/0116023 | A1 | 4/2023 | Yukiko et al. | |
| 2024/0181945 | A1 * | 6/2024 | Kunimoto | B32B 9/046 |

FOREIGN PATENT DOCUMENTS

| | | | |
|---|---|---|---|
| JP | 2012217801 | A | 11/2012 |
| JP | 2020081171 | A | 6/2020 |
| JP | 2022161550 | A | 10/2022 |
| WO | 2022215298 | A1 | 10/2022 |

OTHER PUBLICATIONS

Jan. 24, 2026, search result of Office Action issued by the China National Intellectual Property Administration in the corresponding Chinese Patent Application No. 202410247381.7.

* cited by examiner

SEAT COVERING MATERIAL AND SEAT

TECHNICAL FIELD

The present disclosure relates to a seat covering material and a seat.

BACKGROUND

As seats, for example, vehicle seats in which seated person sides of seat pads are covered with covering materials have been developed (see Patent Literature (PTL) 1 below). As the covering materials used in such seats, ones having an outer layer, a resin foam layer, a lining layer, and the like are known. However, such covering materials have a problem that wrinkles may occur on surfaces of the covering materials, making the seats unusable as products.

In order to solve this problem, development has been proceeded to prevent the occurrence of wrinkles on the surface of the covering material by applying some processing to the lining layer. For example, in PTL 2 below, the occurrence of wrinkles is prevented by punching or slitting the lining layer.

CITATION LIST

Patent Literature

PTL 1: JP 2020-081171 A
PTL 2: JP 2022-161550 A

SUMMARY

In a covering material with a punched or slit lining layer, as in PTL 2 above, the occurrence of wrinkles on a covering material surface is prevented. However, since part of the lining layer is removed by slitting, punching, or the like, processing marks affect the covering material surface, causing a new problem that the design properties of the covering material are damaged.

It would be helpful to provide a seat covering material that prevents the occurrence of wrinkles and has excellent design properties.

It would be also helpful to provide, with the use of such a seat covering material, a seat that prevents the occurrence of wrinkles and has excellent design properties.

The gist structure of a seat covering material and a seat according to the present disclosure that solve the above problems is as follows.

[1] A seat covering material includes at least:
an outer layer;
a resin foam layer; and
a lining layer,
wherein
the outer layer, the resin foam layer, and the lining layer are arranged in this order,
at least one of the lining layer or the resin foam layer has a cut, and
the depth of the cut in the lining layer is a depth that reaches the resin foam layer but does not penetrate the resin foam layer.

[2] A seat covering material includes at least:
an outer layer;
a resin foam layer; and
a lining layer, wherein
the outer layer, the resin foam layer, and the lining layer are arranged in this order,
at least one of the lining layer or the resin foam layer has a cut, and
the depth of the cut in the lining layer is a depth that penetrates the resin foam layer but does not reach the outer layer.

[3] A seat covering material includes at least:
an outer layer;
a resin foam layer; and
a lining layer,
wherein
at least one of the lining layer or the resin foam layer has a cut,
the lining layer includes a first lining layer and a second lining layer,
the outer layer, the first lining layer, the resin foam layer, and the second lining layer are arranged in this order, and
at least one of the first lining layer or the second lining layer has a cut.

[4] The seat covering material according to [3], wherein the first lining layer has a cut, and
the depth of the cut in the first lining layer is a depth that does not penetrate the resin foam layer.

[5] The seat covering material according to [3], wherein the first lining layer has a cut, and
the depth of the cut in the first lining layer is a depth that penetrates the resin foam layer and reaches the second lining layer.

[6] The seat covering material according to [3], wherein the second lining layer has a cut, and
the depth of the cut in the second lining layer is a depth that does not penetrate the resin foam layer.

[7] The seat covering material according to [3], wherein the second lining layer has a cut, and
the depth of the cut in the second lining layer is a depth that penetrates the resin foam layer and reaches the first lining layer.

[8] The seat covering material according to [3], wherein the second lining layer has a cut, and
the depth of the cut in the second lining layer is a depth that penetrates the resin foam layer and the first lining layer but does not reach the outer layer.

[9] A seat includes the seat covering material according to any one of [1] to [8].

The present disclosure can provide a seat covering material that prevents the occurrence of wrinkles and has excellent design properties.

The present disclosure can also provide, with the use of such a seat covering material, a seat that prevents the occurrence of wrinkles and has excellent design properties.

DETAILED DESCRIPTION

A covering material according to the present disclosure and a seat using the covering material will be exemplarily described below in detail with reference to the drawings based on embodiments thereof.

Definitions

In this specification, "top," "bottom," "left," "right," "front," and "rear" refer to directions as viewed from a seated person who is sitting in a seat.

In this specification, "excellent design properties" means that marks of processing applied to a lining layer cannot be seen or are difficult to see on a covering material surface.

<Seat>

Figure 1:
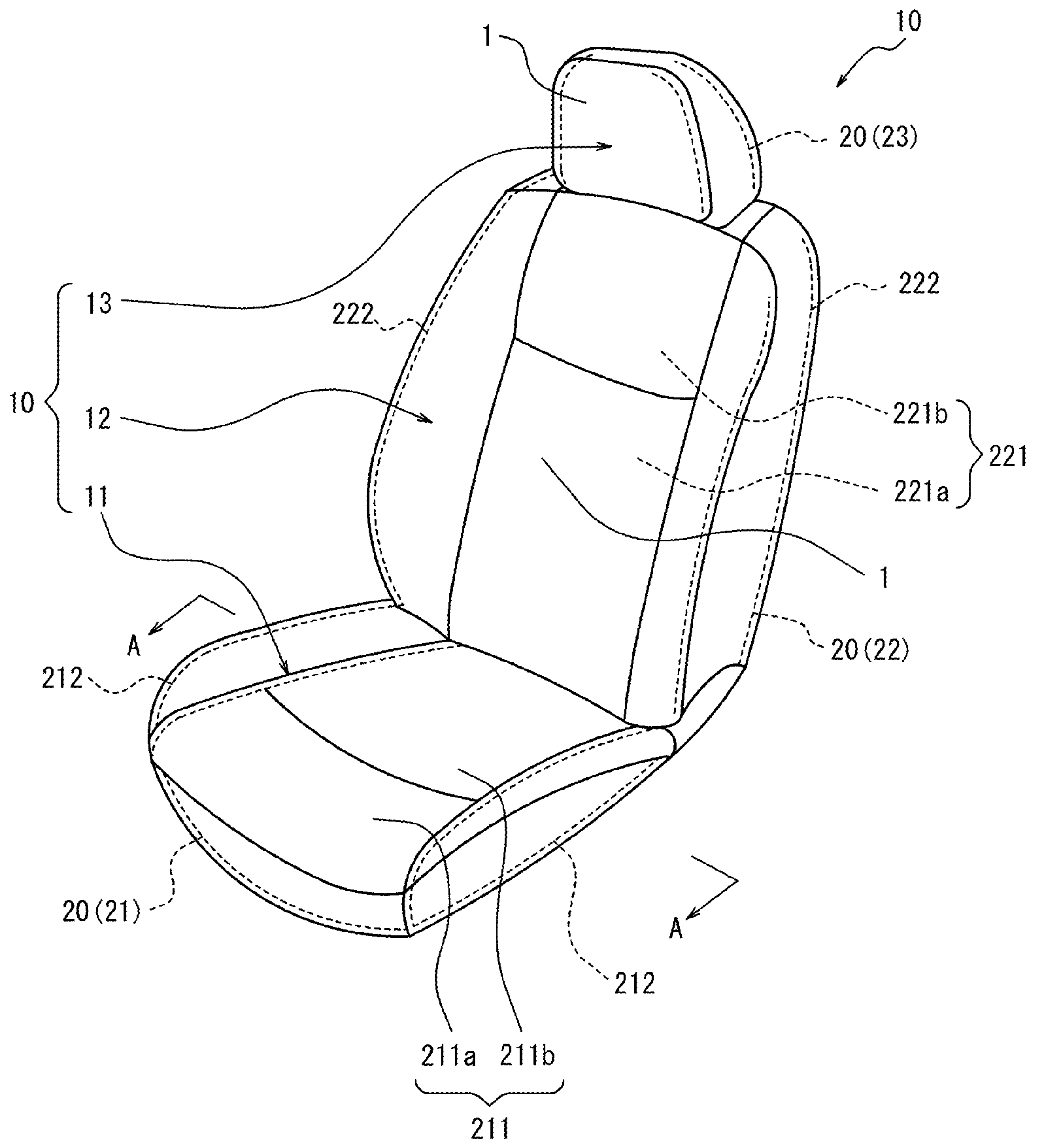
FIG. 1 is a perspective view schematically illustrating a seat according to one embodiment of the present disclosure.

FIG. 1 is a perspective view schematically illustrating a seat according to one embodiment of the present disclosure. In FIG. 1, reference numeral 10 denotes a seat according to one embodiment of the present disclosure. The seat 10 can be any type of seat in which natural leather, synthetic leather, fabric, or the like is used. In this embodiment, the seat 10 is configured as a vehicle seat (passenger seat).

With reference to FIG. 1, the seat 10 includes a covering material 1 and a seat pad 20. The seat pad 20 is formed of a resin foam. A molding material for obtaining the resin foam is, for example, a soft polyurethane foam in which a soft polyurethane resin is mixed with a foaming agent. However, according to the present disclosure, various foam resins can be used as the molding material. In this embodiment, the seated person side of the seat pad 20 is covered with the covering material 1. The seat 10 can also include a frame (not illustrated) that is installed on the rear side of the seat pad 20.

The seat 10 includes a seat cushion 11 and a seat back 12. In this embodiment, the seat 10 can further include a headrest 13, as illustrated in FIG. 1, to support the head of a seated person.

Similarly, the seat pad 20 includes a cushion pad 21 and a back pad 22. In this embodiment, the seat pad 20 can further include a head pad 23, as illustrated in FIG. 1.

Figure 2:
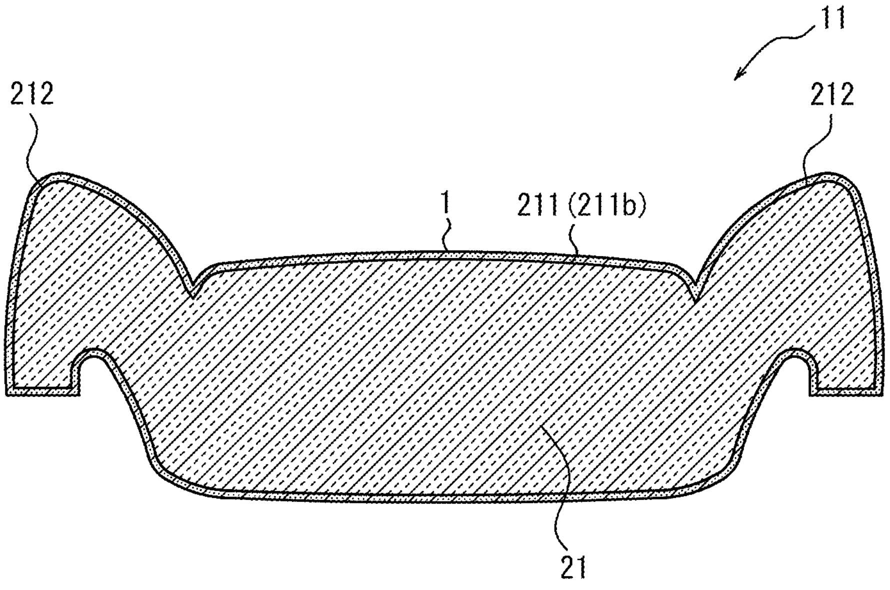
FIG. 2 is an A-A cross-sectional view of FIG. 1.

In the seat cushion 11, the seated person side of the cushion pad 21 is covered with the covering material 1. In this embodiment, the cushion pad 21 has a main pad portion 211 configured to support the buttocks and thighs of the seated person from the bottom side, and a pair of side pad portions 212 configured to be located on both the left and right sides of the main pad portion 211 and raised on the top side from the main pad portion 211, to support the seated person from both the left and right sides. Furthermore, in this embodiment, the main pad portion 211 is constituted of a lower thigh portion 211*a* configured to support the thighs of the seated person from the bottom side, and a lower buttock portion 211*b* configured to be located on the rear side relative to the lower thigh portion 211*a*, to support the buttocks of the seated person from the bottom side. FIG. 2 illustrates an A-A cross-sectional view of FIG. 1.

With reference to FIG. 1, in the seat back 12, the seated person side of the back pad 22 is covered with the covering material 1. The back pad 22 has a main pad portion 221 configured to support the back of the seated person from the rear side, and a pair of side pad portions 222 configured to be located on the left and right sides of the main pad portion 221 and raised to the front side from the main pad portion 221, to support the seated person from both the left and right sides. Furthermore, in this embodiment, the main pad portion 221 is constituted of a waist portion 221*a* configured to support the waist of the seated person from the rear side, and a shoulder portion 221*b* configured to be located on the top side relative to the waist portion 221*a*, to support the shoulders of the seated person from the rear side.

Furthermore, in this embodiment, in the headrest 13, the seated person side of the head pad 23 is also covered with the covering material 1.

<Covering Material>

In one embodiment of the present disclosure, the covering material 1 includes at least an outer layer, a resin foam layer, and a lining layer. At least one of the lining layer or the resin foam layer has cuts.

The cuts in at least one of the layers can prevent the occurrence of wrinkles on a covering material surface. In addition, the cutting does not remove part of the lining layer, in contrast to punching or slitting, and thus is less likely to leave processing marks, resulting in providing a covering material with excellent design properties.

In this embodiment, the covering material 1 preferably includes the outer layer, the resin foam layer, and the lining layer arranged in this order.

In one embodiment of the present disclosure, the lining layer may include a first lining layer and a second lining layer. In this case, at least one of the first lining layer or the second lining layer preferably has cuts.

Also in this case, the cuts in the lining layer can prevent the occurrence of wrinkles on the covering material surface. In addition, the cutting does not remove part of the lining layer, in contrast to punching or slitting, and thus is less likely to leave processing marks, resulting in providing a covering material with excellent design properties.

When the lining layer includes the first lining layer and the second lining layer, the covering material preferably includes the outer layer, the first lining layer, the resin foam layer, and the second lining layer arranged in this order.

(Outer Layer)

In this embodiment, the outer layer is formed of natural leather (genuine leather), synthetic leather, fabric, or the like. Examples of natural leather include cowhide, horsehide, sheephide, deerhide, ostrich leather, pigskin, and goatskin. Examples of synthetic leather include sheets with a resin layer, such as polyurethane, stacked on a fabric made of nylon, polyester, or the like. Examples of fabric include, for example, knitted, woven, and non-woven fabrics.

Figure 3:
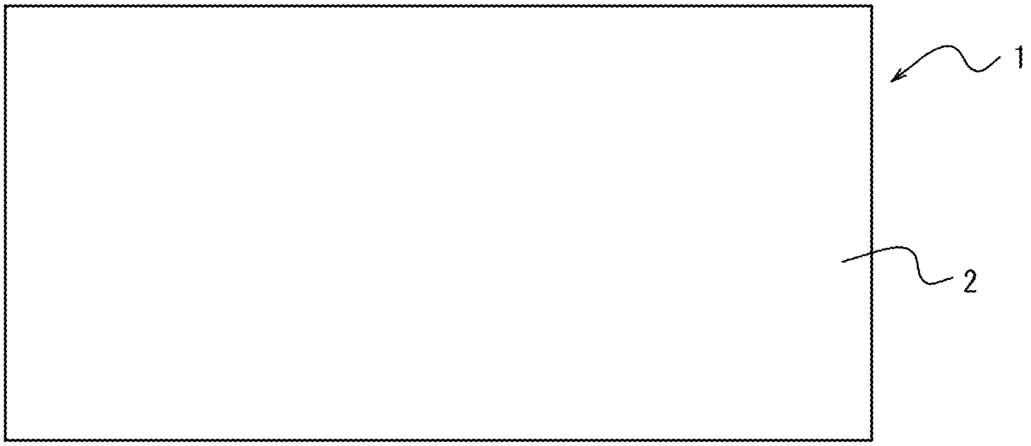
FIG. 3 is a plan view schematically illustrating a covering material according to one embodiment of the present disclosure, from an outer layer side of the covering material.

FIG. 3 is a plan view schematically illustrating, from an outer layer 2 side, a covering material 1 according to one embodiment of the present disclosure. In FIG. 3, reference numeral 2 denotes an outer layer. The outer layer 2 is an outer surface layer that faces the seated person side when the covering material 1 is configured as part of the seat 10.

(Resin Foam Layer)

In this embodiment, the resin foam layer is formed of resin foam. A molding material for obtaining the resin foam is, for example, soft polyurethane foam in which a soft polyurethane resin is mixed with a foaming agent. However, according to the present disclosure, various foam resins can be used as the molding material.

As described above, in the present disclosure, the resin foam layer may have cuts. The cuts may or may not penetrate the resin foam layer.

The depth of the cuts may be a depth that reaches the resin foam layer but does not penetrate the resin foam layer. The depth of the cuts may be a depth that reaches the resin foam layer but does not reach the outer layer.

In the present disclosure, the covering material may include two or more resin foam layers.

(Lining Layer)

In this embodiment, a lining layer 4 is formed of a lining base fabric. The lining base fabric is, for example, a woven or non-woven fabric formed of a resin such as nylon.

Figure 4:
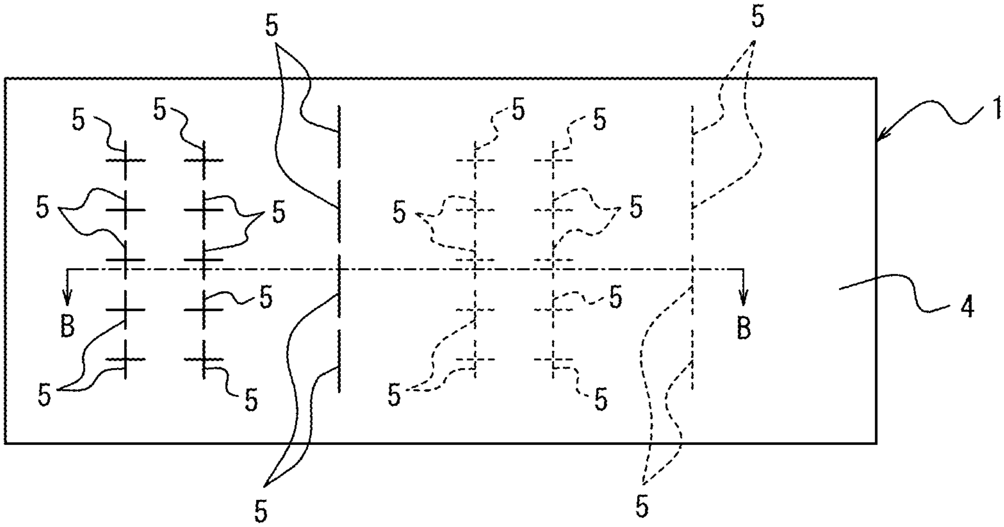
FIG. 4 is a plan view schematically illustrating the covering material of FIG. 3, from a lining layer side of the covering material.

FIG. 4 is a plan view schematically illustrating, from the lining layer 4 side, a covering material 1 according to one embodiment of the present disclosure. In FIG. 4, reference numeral 4 denotes a lining layer. The lining layer 4 is a back surface layer that faces a seat body side (in this embodiment, the seat pad 20 side) when the covering material 1 is configured as part of the seat 10.

With reference to FIG. 4, in this embodiment, the lining layer 4 (first lining layer and/or second lining layer) has cuts 5. Note that, cuts 5 represented by solid lines in FIG. 4 indicate incisions in the second lining layer, and cuts 5 represented by dashed lines indicate incisions in the first lining layer.

(Cuts)

One of causes why wrinkles occur on a surface of a covering material is that the covering material has an outer layer, a resin foam layer, and a lining layer made of different materials, and the rigidity of each layer is different. Therefore, to reduce the difference in rigidity between the outer layer and the lining layer, it is considered effective to cut or otherwise process the lining layer or the like to release stress.

As processing to be applied to the lining layer or the like, there is slitting, punching, or the like, as well as cutting. However, when part of the lining layer or the like is removed by slitting, punching, or the like, the outer layer falls down at positions corresponding to removed portions of the lining layer, so processing marks are left in the covering material surface, thus deteriorating the design properties of the covering material. On the contrary, cutting the lining layer or the like is less likely to leave processing marks, thus enhancing the design properties of the covering material with cuts. Since the cutting does not remove part of the lining layer or the like, in contrast to slitting, punching, or the like, the cutting has the advantage of reducing the amount of waste, such as the removed lining layer.

Figure 5:
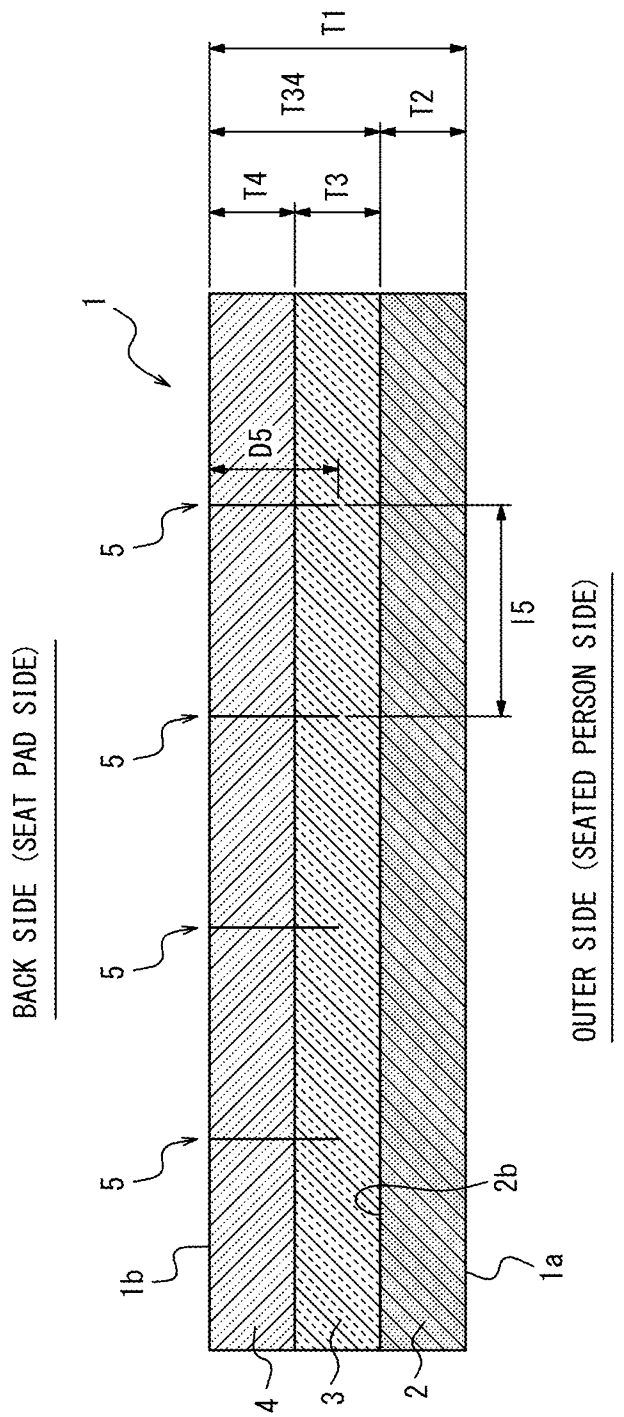
FIG. 5 is a B-B cross-sectional view of FIG. 4 in which, in a covering material according to one embodiment of the present disclosure, a lining layer has cuts.

FIG. 5 is a B-B cross-sectional view of FIG. 4 in which, in a covering material according to one embodiment of the present disclosure, a lining layer has cuts. With reference to FIG. 5, a covering material 1 includes an outer layer 2, a resin foam layer 3, and a lining layer 4 arranged in this order. In FIG. 5, the covering material 1 has cuts 5 with a depth of D5.

With reference to FIG. 5, the depth D5 of the cuts 5 is a depth from a back surface 1*b* of the covering material 1 (a surface of the covering material 1 on the lining layer 4 side) to an outer surface 1*a* of the covering material 1 (a surface of the covering material 1 on the outer layer 2 side). In this embodiment, the depth D5 of the cuts 5 is the same as or shallower than a depth from the back surface 1*b* of the covering material 1 to a back surface 2*b* of the outer layer 2 (a surface of the outer layer 2 on the resin foam layer 3 side (i.e., a surface in contact with the resin foam layer 3)). In other words, the dimension of the depth D5 of the cuts 5 is the same as or shorter than the dimension of the thickness T34 of the resin foam layer 3 and the lining layer 4. Here, the thickness T34 is the thickness between the back surface 1*b* of the covering material 1 and the back surface 2*b* of the outer layer 2.

In FIG. 5, the depth D5 of the cuts is a depth that does not penetrate the resin foam layer 3. In the present disclosure, the depth D5 of the cuts 5 may be a depth that penetrates the resin foam layer 3 but does not reach the outer layer 2. As illustrated in FIG. 5, in the present disclosure, the depth D5 of the cuts 5 may be a depth that reaches the resin foam layer 3 but does not penetrate the resin foam layer 3. Whichever the depth, the occurrence of wrinkles on the surface of the covering material can be prevented.

With reference to FIG. 5, T2 is the thickness of the outer layer 2, T3 is the thickness of the resin foam layer 3, and T4 is the thickness of the lining layer 4. The thickness of each layer can be set as appropriate. The thickness T2 of the outer layer 2 can be, for example, 0.6 mm to 1.1 mm. The thickness T3 of the resin foam layer 3 can be, for example, 5 mm to 10 mm. The thickness T4 of the lining layer 4 can be, for example, 0.2 mm.

The depth D5 of the cuts 5 can be set as appropriate. The depth D5 of the cuts 5 can be, for example, 0.1 mm to 1.2 mm. For example, when T2=1.1 mm, T3=5 mm, and T4=0.2 mm, the depth D5 of the cuts 5 can be 1.2 mm.

The depth D5 of the cuts 5 can be set, for example, in relation to the thickness T34. In the following description, by way of example for simplification, the thickness T34 is assumed to be the sum of the thickness T3 of the resin foam layer 3 and the thickness T4 of the lining layer 4. For example, when the depth D5 of the cuts 5 is 0.3 mm and the thickness T34 of the resin foam layer 3 and the lining layer 4 is 5.2 mm (T3=5 mm, T4=0.2 mm), D5:T34=0.3:5.2≈1:17.3. When the depth D5 of the cuts 5 is 1.2 mm, then D5:T34=1.2:5.2≈1:4.3. When the depth D5 of the cuts 5 is 0.3 mm and the thickness T34 of the resin foam layer 3 and the lining layer 4 is 10.2 mm (T3=10 mm, T4=0.2 mm), D5:T34=0.3:10.2≈1:34. When the depth D5 of the cuts 5 is 1.2 mm, then D5:T34=1.2:10.2≠1:8.5.

Similarly, the depth D5 can be set in relation to the thickness T2 of the outer layer 2. For example, when the depth D5 of the cuts 5 is 0.3 mm and the thickness T2 of the outer layer 2 is 1.1 mm, D5:T2=0.3:1.1≈1:3.6. When the depth D5 of the cuts 5 is 0.3 mm and the thickness T2 of the outer layer 2 is 0.6 mm, D5:T2=0.3:0.6≈1:2. When the depth D5 of the cuts 5 is 1.2 mm, then D5:T2=1.2:0.6≈2:1. Here, the thickness T2 of the outer layer 2 is the thickness between the outer surface 1*a* of the covering material 1 and the back surface 2*b* of the outer layer 2.

The depth D5 can also be set in relation to the thickness T1 of the covering material 1. Here, the thickness T1 of the covering material 1 is the thickness between the back surface 1*b* of the covering material 1 and the outer surface 1*a* of the covering material 1.

In one embodiment of the present disclosure, the lining layer may have a first lining layer and a second lining layer. In this case, only the first lining layer, only the second lining layer, or both of the first and second lining layers may have cuts. In either case, the occurrence of wrinkles on the surface of the covering material can be prevented. Among these, from the viewpoint of reducing stress more, both of the first lining layer and the second lining layer preferably have cuts.

Figure 6:
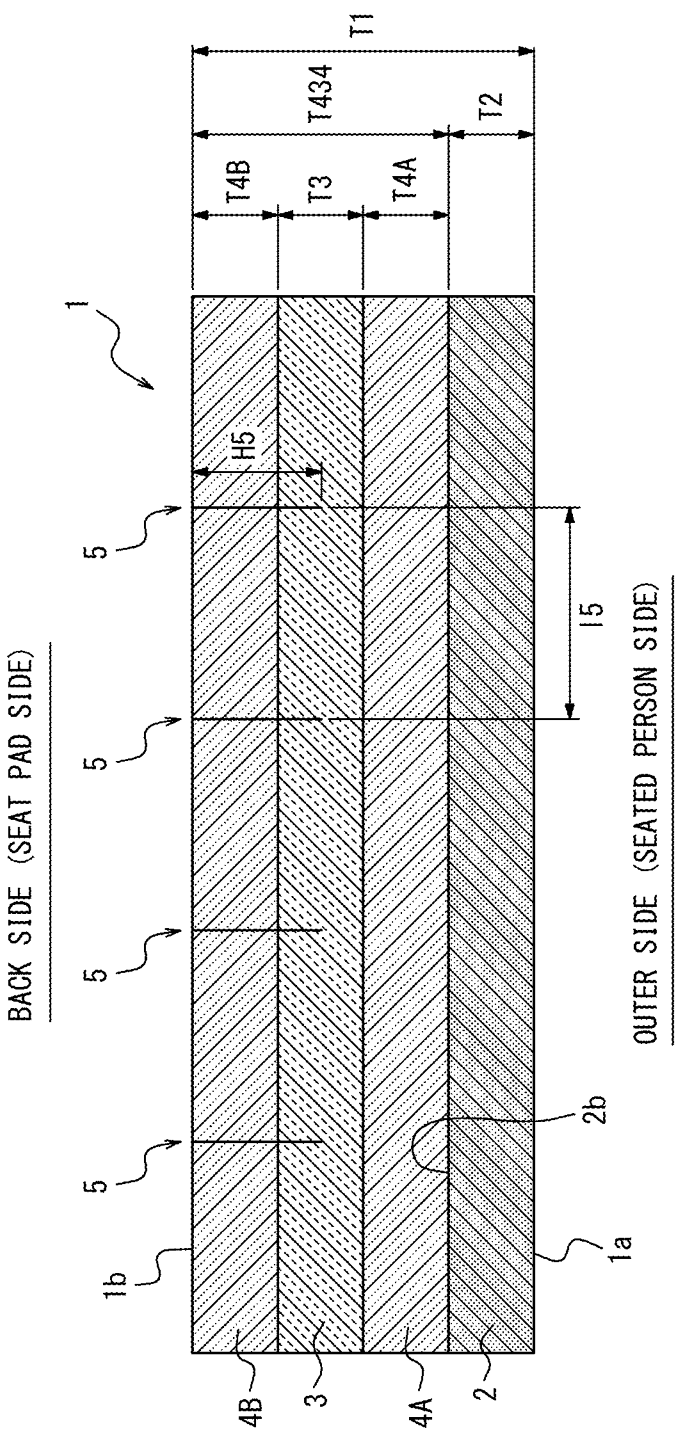
FIG. 6 is a B-B cross-sectional view of FIG. 4 in which, in a covering material according to one embodiment of the present disclosure, a second lining layer has cuts.

FIG. 6 is a B-B cross-sectional view of FIG. 4 in which, in a covering material according to one embodiment of the present disclosure, a second lining layer has cuts. With reference to FIG. 6, a covering material 1 has an outer layer

2, a first lining layer 4A, a resin foam layer 3, and a second lining layer 4B arranged in this order. In FIG. 6, the covering material 1 has cuts 5 with a depth of H5.

With reference to FIG. 6, the depth H5 of the cuts 5 in FIG. 6 is a depth from a back surface 1*b* of the covering material 1 (a surface of the covering material 1 on the second lining layer 4B side) to an outer surface 1*a* of the covering material 1 (a surface of the covering material 1 on the outer layer 2 side). In this embodiment, the depth H5 of the cuts 5 is the same as or shallower than a depth (thickness) from the back surface 1*b* of the covering material 1 to a back surface 2*b* of the outer layer 2 (a surface of the outer layer 2 on the first lining layer 4A side (i.e., a surface in contact with the first lining layer 4A)). In other words, the dimension of the depth H5 of the cuts 5 is the same as or shorter than the dimension of the thickness T434 of the resin foam layer 3, the first lining layer 4A, and the second lining layer 4B. Here, the thickness T434 is the thickness between the back surface 1*b* of the covering material 1 and the back surface 2*b* of the outer layer 2.

In FIG. 6, the depth H5 of the cuts is a depth that does not penetrate the resin foam layer 3. In the present disclosure, the depth H5 of the cuts 5 may be a depth that penetrates the resin foam layer 3 but does not reach the first lining layer 4A, or may be a depth that penetrates the resin foam layer 3 and the first lining layer 4A but does not reach the outer layer 2. Whichever the depth, the occurrence of wrinkles on the surface of the covering material can be prevented.

With reference to FIG. 6, T2 is the thickness of the outer layer 2, T3 is the thickness of the resin foam layer 3, T4A is the thickness of the first lining layer 4A, and T4B is the thickness of the second lining layer 4B. The thickness of each layer can be set as appropriate. The thickness T2 of the outer layer 2 can be, for example, 0.6 mm to 1.1 mm. The thickness T3 of the resin foam layer 3 can be, for example, 5 mm to 10 mm. The thicknesses T4A and T4B of the first lining layer 4A and the second lining layer 4B can be, for example, 0.2 mm each.

In this embodiment, the depth H5 of the cuts 5 can be set as appropriate. The depth H5 of the cuts 5 can be, for example, 0.1 mm to 1.2 mm. For example, when T2=1.1 mm, T3=5 mm, T4A=0.2 mm, and T4B=0.2 mm, the depth H5 of the cuts 5 can be 1.2 mm.

For example, the depth H5 can be set in relation to the thickness T434. In the following description, by way of example for simplification, the thickness T434 is assumed to be the sum of the thickness T3 of the resin foam layer 3, the thickness T4A of the first lining layer 4A, and the thickness T4B of the second lining layer 4B. For example, when the depth H5 of the cuts 5 is 0.3 mm and the thickness T434 of the resin foam layer 3, the first lining layer 4A, and the second lining layer 4B is 5.2 mm (T3=5 mm, T4A=T4B=0.1 mm), H5:T434=0.3:5.2≈1:17.3. When the depth H5 of the cuts 5 is 1.2 mm, then H5:T434=1.2:5.2≈1:4.3. When the depth H5 of the cuts 5 is 0.3 mm and the thickness T434 of the resin foam layer 3, the first lining layer 4A, and the second lining layer 4B is 10.2 mm (T3=10 mm, T4A=T4B=0.1 mm), H5:T434=0.3:10.2≈1:34. When the depth H5 of the cuts 5 is 1.2 mm, then H5:T434=1.2:10.2≈1:8.5.

Similarly, the depth H5 can be set in relation to the thickness T2 of the outer layer 2. For example, when the depth H5 of the cuts 5 is 0.3 mm and the thickness T2 of the outer layer 2 is 1.1 mm, H5:T2=0.3:1.1≈1:3.6. When the depth H5 of the cuts 5 is 0.3 mm and the thickness T2 of the outer layer 2 is 0.6 mm, H5:T2=0.3:0.6≈1:2. When the depth H5 of the cuts 5 is 1.2, then H5:T2=1.2:0.6≈2:1. Here, the thickness T2 of the outer layer 2 is the thickness between the outer surface 1*a* of the covering material 1 and the back surface 2*b* of the outer layer 2.

The depth H5 can also be set in relation to the thickness T1 of the covering material 1. Here, the thickness T1 of the covering material 1 is the thickness between the back surface 1*b* of the covering material 1 and the outer surface 1*a* of the covering material 1.

Figure 7:
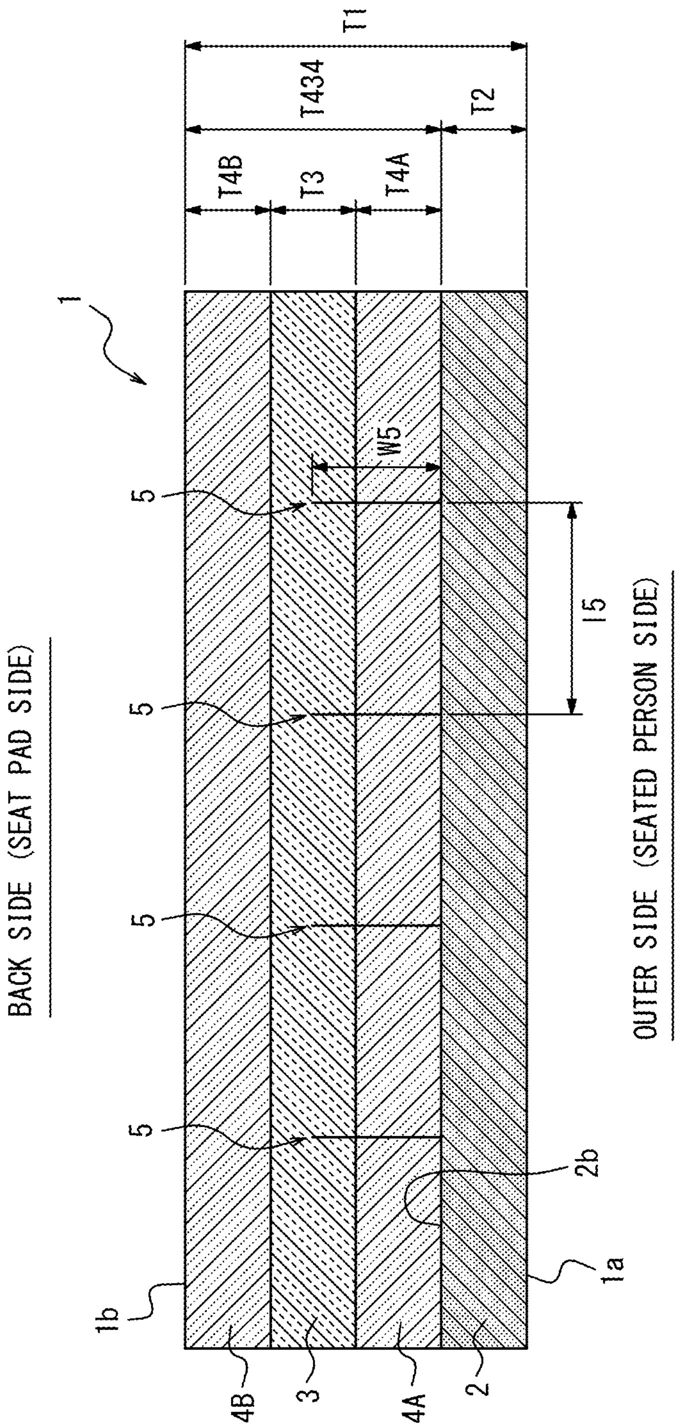
FIG. 7 is a B-B cross-sectional view of FIG. 4 in which, in a covering material according to one embodiment of the present disclosure, a first lining layer has cuts.

FIG. 7 is a B-B cross-sectional view of FIG. 4 in which, in a covering material according to one embodiment of the present disclosure, a first lining layer has cuts. With reference to FIG. 7, a covering material 1 has an outer layer 2, a first lining layer 4A, a resin foam layer 3, and a second lining layer 4B arranged in this order. In FIG. 7, the covering material 1 has cuts 5 with a depth of W5.

With reference to FIG. 7, the depth W5 of the cuts 5 in FIG. 7 is a depth from a back surface 2*b* of the outer layer 2 (a surface of the outer layer 2 on the first lining layer 4A side (i.e., a surface in contact with the first lining layer 4A)) to a back surface 1*b* of the covering material 1 (a surface of the covering material 1 on the second lining layer 4B side). In this embodiment, the depth W5 of the cuts 5 is the same as or shallower than a thickness from the back surface 2*b* of the outer layer 2 to the back surface 1*b* of the covering material 1. In other words, the dimension of the depth W5 of the cuts 5 is the same as or shorter than the dimension of the thickness T434 of the resin foam layer 3, the first lining layer 4A, and the second lining layer 4B. Here, the thickness T434 is the thickness between the back surface 1*b* of the covering material 1 and the back surface 2*b* of the outer layer 2.

In FIG. 7, the depth W5 of the cuts is a depth that does not penetrate the resin foam layer 3. However, in the present disclosure, the depth W5 of the cuts 5 may be a depth that penetrates the resin foam layer 3 but does not reach the second lining layer 4B, or a depth that penetrates the resin foam layer 3 and the first lining layer 4A and penetrates the second lining layer 4B. Whichever the depth, the occurrence of wrinkles on the surface of the covering material can be prevented.

With reference to FIG. 7, T2 is the thickness of the outer layer 2, T3 is the thickness of the resin foam layer 3, T4A is the thickness of the first lining layer 4A, and T4B is the thickness of the second lining layer 4B. The thickness of each layer can be set as appropriate. The thickness T2 of the outer layer 2 can be, for example, 0.6 mm to 1.1 mm. The thickness T3 of the resin foam layer 3 can be, for example, 5 mm to 10 mm. The thicknesses T4A and T4B of the first lining layer 4A and the second lining layer 4B can be, for example, 0.2 mm each.

In this embodiment, the depth W5 of the cuts 5 can be set as appropriate. The depth W5 of the cuts 5 can be, for example, 0.1 mm to 1.2 mm. For example, when T2=1.1 mm, T3=5 mm, T4A=0.2 mm, and T4B=0.2 mm, the depth W5 of the cuts 5 can be 1.2 mm.

For example, the depth W5 can be set in relation to the thickness T434. In the following description, by way of example for simplification, the thickness T434 is assumed to be the sum of the thickness T3 of the resin foam layer 3, the thickness T4A of the first lining layer 4A, and the thickness T4B of the second lining layer 4B. For example, when the depth W5 of the cuts 5 is 0.3 mm and the thickness T434 of the resin foam layer 3, the first lining layer 4A, and the second lining layer 4B is 5.2 mm (T3=5 mm, T4A=T4B=0.1 mm), W5:T434=0.3:5.2≈1:17.3. When the depth W5 of the cuts 5 is 1.2 mm, then W5:T434=1.2:5.2≈1:4.3. When the depth W5 of the cuts 5 is 0.3 mm and the thickness T434 of the resin foam layer 3, the first lining layer 4A, and the second lining layer 4B is 10.2 mm (T3=10 mm, T4A=T4B=0.1 mm), W5:T434=0.3:10.2≈1:34. When the depth W5 of the cuts 5 is 1.2 mm, then W5:T434=1.2:10.2≈1:8.5.

Similarly, the depth W5 can be set in relation to the thickness T2 of the outer layer 2. For example, when the depth W5 of the cuts 5 is 0.3 mm and the thickness T2 of the outer layer 2 is 1.1 mm, W5:T2=0.3:1.1≈1:3.6. When the depth W5 of the cuts 5 is 0.3 mm and the thickness T2 of the outer layer 2 is 0.6 mm, W5:T2=0.3:0.6≈1:2. When the depth W5 of the cuts 5 is 1.2, then W5:T2=1.2:0.6≈2:1. Here, the thickness T2 of the outer layer 2 is the thickness between the outer surface 1*a* of the covering material 1 and the back surface 2*b* of the outer layer 2.

The depth W5 can also be set in relation to the thickness T1 of the covering material 1. Here, the thickness T1 of the covering material 1 is the thickness between the back surface 1*b* of the covering material 1 and the outer surface 1*a* of the covering material 1 (a surface of the covering material 1 on the outer layer 2 side).

In the present disclosure, the intervals 15 between the cuts 5 are not particularly limited and can be, for example, 15=1 cm. Here, the intervals 15 are, in a plan view of the covering material 1, intervals between the cuts 5 in a direction perpendicular to a direction in which the cuts 5 extend (extension direction of the cuts 5).

In the present disclosure, the shape of the cuts is not particularly limited and can be any shape. For example, the shape of the cuts can be crisscross, straight, U-shaped, wavy, lattice, or the like. These shapes may be used alone, or in combination of two or more.

In the present disclosure, the positions, density, number, and the like of the cuts 5 are not particularly limited and can be set as appropriate. The positions of the cuts 5 are not limited, but can be, for example, curved portions of the covering material. The number of the cuts 5 is not limited, but can be from 1 to 50 per covering material, for example.

In the present disclosure, the method of forming the cuts 5 is not particularly limited and known methods can be used. As a method of forming the cuts 5, for example, stamping can be used.

(Miscellaneous)

The covering material 1 of the present disclosure may have further layers, in addition to the outer layer 2, the resin foam layer 3, and the lining layer 4 (first lining layer 4A and/or second lining layer 4B). For example, a further lining layer 4 or resin foam layer 3 can be provided between the lining layer 4 and the resin foam layer 3, between the resin foam layer 3 and the outer layer 2, and/or between the lining layer 4 and the outer layer 2. Other layers, such as adhesive layers, can also be interposed.

<Methods for Manufacturing Covering Material and Seat>

Methods for manufacturing the covering material and the seat of the present disclosure will be described below.

(Method of Manufacturing Covering Material)

As a method of manufacturing the covering material, a case in which a covering material 1 includes an outer layer 2, a resin foam layer 3, and a lining layer 4 will be described.

First, the resin foam layer 3 and the lining layer 4 are prepared, and the resin foam layer 3 and the lining layer 4 are bonded to form a composite body. Next, the composite body of the resin foam layer 3 and the lining layer 4 is stamped with a stamping die of a predetermined shape. The outer layer 2 is then bonded to the stamped composite body on the resin foam layer 3 side.

Thereby, the covering material 1 that prevents the occurrence of wrinkles and has excellent design properties can be obtained.

The method of bonding the outer layer 2, the resin foam layer 3, and the lining layer 4 is not particularly limited, and known methods can be used. Examples of the bonding method include the flame lamination method, moisture-type adhesive method, water-based adhesive method, and spun-bonding adhesive method.

(Method of Manufacturing Seat)

First, a seat pad 20 is prepared as the seat body described above. Then, by using the same method as before, the seat pad 20 is covered with the covering material 1.

Thereby, a seat 10 with the prevented occurrence of wrinkles and excellent design properties can be easily obtained.

The above description is only examples of the embodiments of the present disclosure, and various variations are possible in accordance with the scope of claims. Furthermore, various structures employed in each embodiment can be selectively modified or omitted as appropriate.

EXAMPLES

The present disclosure will be described in more detail below with examples, but the present disclosure is not limited to the following examples.

<Manufacture of Covering Materials>

Covering materials of Example 1 and Comparative Examples 1 to 4 were manufactured as follows.

Example 1: Cutting

First, a urethane foam (resin foam layer) and a lining base fabric (lining layer) were bonded to form a composite body of the urethane foam (product name "GFGM" produced by Archem Inc.) and the lining base fabric (product name "Nylon tricothalf 17 dtex (25C/28W)" produced by Kiryu Tricot Industrial Co., Ltd.). The composite body was then stamped with a cross-shaped stamping die. Leather (product name "LUXOR CH" produced by PANGEA) was then bonded to the composite body on the polyurethane foam side, to manufacture a covering material.

Comparative Example 1: No Processing

A covering material was manufactured in the same manner as in Example 1, except that the lining layer was not cut.

Comparative Example 2: Round Hole Punching

A covering material was manufactured in the same manner as in Example 1, except that the lining layer was punched with round holes instead of cut.

Comparative Example 3: Rhombic Hole Punching

A covering material was manufactured in the same manner as in Example 1, except that the lining layer was punched with rhombic holes instead of cut.

Comparative Example 4: Slitting

A covering material was manufactured in the same manner as in Example 1, except that the lining layer was slit instead of cut.

<Evaluation of Wrinkles on Surface of Covering Material>

Ten test samples were prepared for each type of processing in each of Example and Comparative Examples, and silver surface inspection was performed. After the inspection, the number of wrinkles occurring on a surface of each covering material was evaluated. The test method was conformable to BSDL7102.

Table 1 illustrates the evaluation results.

<Evaluation of Processing Marks>

The surface of each of the manufactured covering materials was visually checked to see whether any processing marks were visible on the covering material surface.

Table 1 illustrates the evaluation results.

As for the processing marks, the marks of the round hole punching and slitting applied to the lining layers appear on the covering material surfaces.

TABLE 1

| | Example 1 | Comparative Example 1 | Comparative Example 2 | Comparative Example 3 | Comparative Example 4 |
|---|---|---|---|---|---|
| Processing | Cutting | No processing | Round hole punching | Rhombic hole punching | Slitting |
| Number of samples | 10 | 10 | 10 | 10 | 10 |
| Number of samples with wrinkles | 0 | 1 | 0 | 0 | 0 |
| Processing marks | Absence | Absence | Presence | Presence | Presence |

From Table 1, it can be seen that the covering material with the cuts in the lining layer has the prevented occurrence of wrinkles, no processing marks, and excellent design properties.

INDUSTRIAL APPLICABILITY

The present disclosure can provide a seat covering material that prevents the occurrence of wrinkles and has excellent design properties.

The present disclosure can also provide, with the use of such a seat covering material, a seat that prevents the occurrence of wrinkles and has excellent design properties.

The invention claimed is:

1. A seat covering material comprising at least:
an outer layer;
a resin foam layer; and
a lining layer,
wherein
the outer layer, the resin foam layer, and the lining layer are arranged in this order,
at least one of the lining layer or the resin foam layer has a cut,
a depth of the cut in the lining layer is a depth that reaches the resin foam layer but does not penetrate the resin foam layer, and
the cut has at least one of a crisscross shape or a U shape.

2. A seat comprising the seat covering material according to claim 1.

3. A seat covering material comprising at least:
an outer layer;
a resin foam layer; and
a lining layer,
wherein
the outer layer, the resin foam layer, and the lining layer are arranged in this order,
at least one of the lining layer or the resin foam layer has a cut,
a depth of the cut in the lining layer is a depth that penetrates the resin foam layer but does not reach the outer layer, and
the cut has at least one of a crisscross shape or a U shape.

4. A seat comprising the seat covering material according to claim 3.

5. A seat covering material comprising at least:
an outer layer;
a resin foam layer; and
a lining layer,
wherein
each of the lining layer and the resin foam layer has a cut,
the cut has at least one of a crisscross shape or a U shape,
the lining layer comprises a first lining layer and a second lining layer,
the outer layer, the first lining layer, the resin foam layer, and the second lining layer are arranged in this order, and
the cut of the lining layer is formed in at least one of the first lining layer or the second lining layer.

6. The seat covering material according to claim 5, wherein
the cut of the lining layer is formed in the first lining layer, and
a depth of the cut in the first lining layer is a depth that does not penetrate the resin foam layer.

7. The seat covering material according to claim 5, wherein
the cut of the lining layer is formed in the first lining layer, and
a depth of the cut in the first lining layer is a depth that penetrates the resin foam layer and reaches the second lining layer.

8. The seat covering material according to claim 5, wherein
the cut of the lining layer is formed in the second lining layer, and
a depth of the cut in the second lining layer is a depth that does not penetrate the resin foam layer.

9. The seat covering material according to claim 5, wherein
the cut of the lining layer is formed in the second lining layer, and
a depth of the cut in the second lining layer is a depth that penetrates the resin foam layer and reaches the first lining layer.

10. The seat covering material according to claim 5, wherein
the cut of the lining layer is formed in the second lining layer, and
a depth of the cut in the second lining layer is a depth that penetrates the resin foam layer and the first lining layer but does not reach the outer layer.

11. A seat comprising the seat covering material according to claim 5.

* * * * *